April 28, 1931. C. L. STOKES 1,802,586
METHOD AND MEANS FOR UTILIZING HYDROGEN IN AIRCRAFT
Filed Oct. 26, 1927
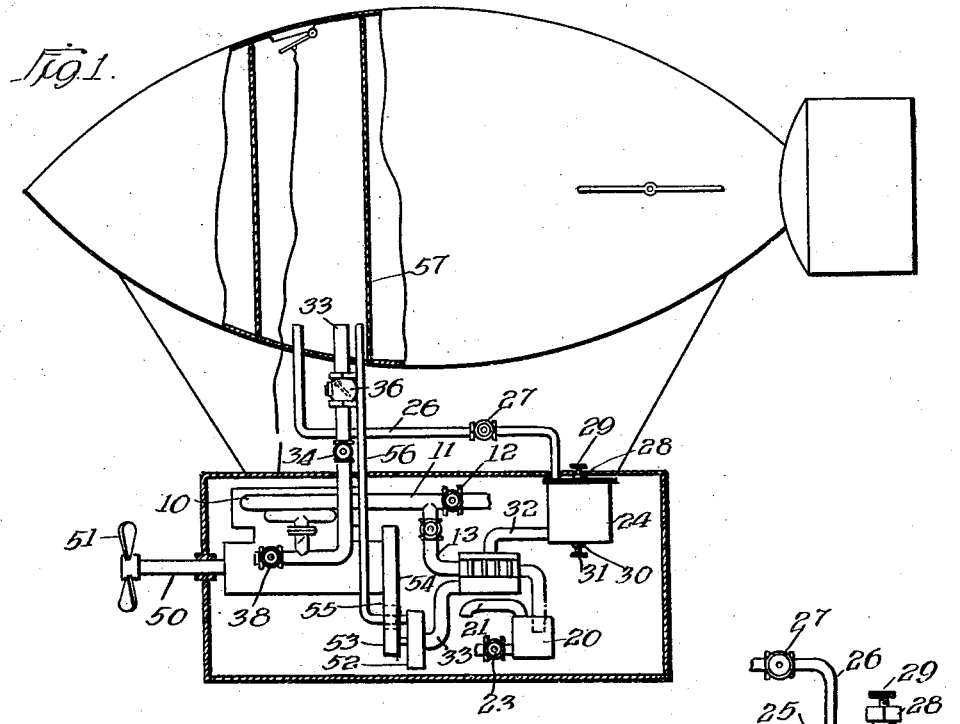
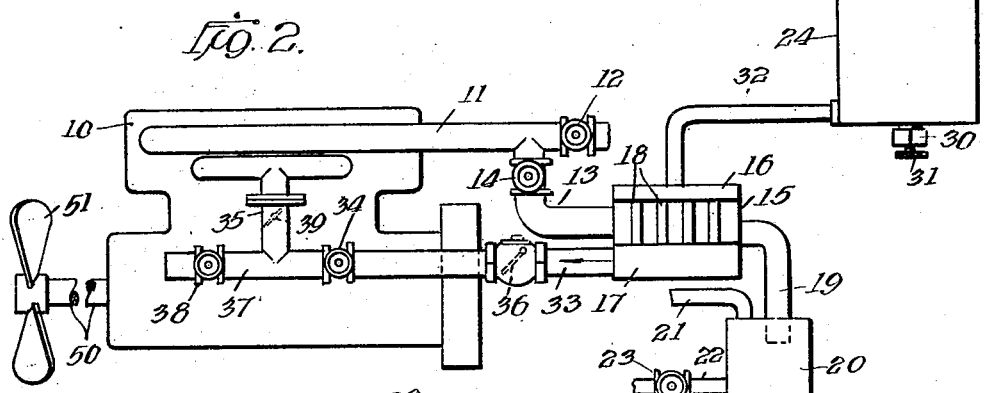
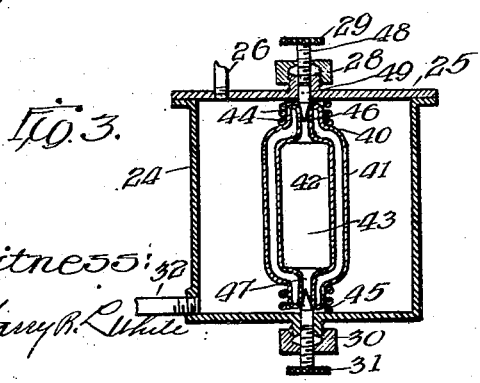
Witness:
Harry R. White
Inventor:
Charles L. Stokes Patented Apr. 28, 1931

1,802,586

UNITED STATES PATENT OFFICE

CHARLES L. STOKES, OF LOS ANGELES, CALIFORNIA

METHOD AND MEANS FOR UTILIZING HYDROGEN IN AIRCRAFT

Application filed October 26, 1927. Serial No. 228,876.

My invention relates to improvements in providing fuel to an internal combustion engine carried by air craft.

The principal object of the invention is to provide a method of utilizing liquid hydrogen as a gaseous fuel to be fed to an internal combustion engine.

Another object of the invention is to provide an efficient method of vaporizing the liquid hydrogen used as fuel whereby the latent heat of vaporization is balanced in part by the latent heat of condensation of combustion products coming from the engine.

Referring to the drawings:

Fig. 1 is a diagrammatic sketch showing an air craft and the associated mechanism for driving the same;

Fig. 2 is a diagrammatic sketch showing the necessary apparatus for applying the method to any type of air craft;

Fig. 3 is a vertical cross section showing details for carrying liquid hydrogen; and Fig. 4 is a sectional view of part of Fig. 3.

In general, air craft are divided principally into two classes, one being airships lighter than air, the other being airships heavier than air, and my invention is equally applicable for use in apparatus used to drive either type.

Referring to Fig. 2, an internal combustion engine 10 is provided with an exhaust pipe 11 passing to atmosphere and being controlled by a valve 12. A by-pass 13, controlled by a valve 14, leads to a heat exchanger 15 containing a header 16 as an upper compartment, and a lower header 17, the two headers being connected by a plurality of pipes 18 in air tight fashion to provide a cross passage therearound. By-pass 13 discharges exhaust gases around pipes 18 to transfer their heat thereto and the exhaust gases, reduced in temperature, together with any water of condensation passes through the pipe 19 to a container 20 whence the stripped exhaust gases pass to atmosphere through a pipe 21 and the condensation products may be drawn off through a pipe 22, controlled by a valve 23.

A container 24, suitably insulated against heat losses, is placed at a higher elevation than the engine 10 and has an air tight cover 25 fitted thereto. In the cover 25 is connected a pipe 26 controlled by a valve 27 and a stuffing box 28 through which a needle valve 29 is operated. The bottom of container 24 includes a stuffing box 30 through which a needle valve 31 is operated. In air craft heavier than air, pipe 26 may open to atmosphere, but is closed therefrom by valve 27.

A discharge pipe 32 leads from the interior of container 24 to the header 16 to the end that liquid passing therethrough will fall through pipes 18 and be vaporized by the heat of the exhaust gases passing therearound, and such vaporized gases pass from the header 17 through a pipe 33 controlled by a valve 34 to the inlet pipe 35 of engine 10, a check valve 36 being placed in the pipe 33 for the purpose of preventing the flame from back fires reaching header 17. An air inlet pipe 37 also leads to a manifold 35 and is controlled by a valve 38 and the mixture of gas and air is controlled as to its volume by the usual butterfly throttle valve 39.

Interiorly of container 24 is mounted a liquid hydrogen container 40 comprising a form of the well known Dewar flask having walls 41 and 42, exhausted therebetween to a very high degree for providing the proper heat insulation for the liquid hydrogen in the interior 43 thereof, and flask 40 may be suspended in container 24 by springs 44 and 45.

An opening 46 is provided in the upper portion of flask 40, the same being adapted to be closed by the needle valve 29 and an opening 47 is provided in the lower portion of flask 40, the same being adapted to be closed by the needle valve 31, valves 29 and 31 being made of an upper threaded metal portion 48 and a lower valve portion 49 made of glass or other similar material of which flask 40 may be constructed, cemented to the metal. Engine 10 is provided with a crank shaft 50 to which is attached the usual propeller 51 which may be a reversing, or feathering propeller, such as is well known in the art.

In the operation of the device in a heavier than air airship, cover 25 is removed from container 24 and flask 40, filled with liquid hydrogen, is inserted therein, and the lower needle valve 31 closes opening 47, needle valve 29 being opened a predetermined distance to permit of the escape of liquid hydrogen being vaporized and thus avoiding any excessive pressure on the interior of container 24. Inasmuch as liquid hydrogen at atmospheric pressure is continually vaporized, container 24 will be gradually filled with hydrogen gas which eventually will fill all the passages from container 24 to throttle valve 39. Upon cranking engine 10, therefore, which is of the usual four cycle type, hydrogen gas will be drawn therein and mixed with a suitable proportion of air depending upon the opening of valves 34 and 38.

A combustible mixture is thus drawn into engine 10 and burnt therein thus giving sufficient power to propeller 21 to perform its functions of raising the airship and driving the same. The exhaust gases from engine 10 pass through pipe 11 and by-pass 13 to thereafter continually heat tubes 18 whereby liquid fuel fed from opening 47 when needle valve 31 is opened a sufficient degree will be continually vaporized and supplied to engine 10. At the same time, the latent heat of vaporization of the liquid fuel will be supplied by latent heat of condensation of the exhaust gases. In the case of liquid hydrogen, the combustion of hydrogen gas derived therefrom is accomplished according to the well known equation $$2H + O = H_2O$$

and by weight, one pound of hydrogen combines with eight pounds of oxygen to form nine pounds of water. This water may be collected in container 20 for any particular purpose, or may be discharged from the airship as quickly as it is formed.

The combustion of hydrogen with oxygen to form water causes no formation of carbon through combustion and therefore no combined carbon such as carbon monoxide or carbon dioxide will be formed, the only carbon present in the exhaust gases being possibly in the form of vaporized lubricating oil which is not a product of the combustion of hydrogen with oxygen.

The needle valve 31 will be opened a sufficient amount to supply the requirements of engine 10 and thereafter upon ceasing to supply the same, valve 31 will be closed and the constant escape of hydrogen gas from the opening 46 will tend to further insulate liquid hydrogen in interior 43 from heat and at the same time provides a safety valve for the relief of any pressure, it being highly desirable that hydrogen gas be not drawn into contact with oxygen in any form until about its entry into engine 10, this being due to the wide range of highly inflammable mixtures that hydrogen forms with oxygen.

The apparatus when used in an airship lighter than air is similar to that described, but the hydrogen after vaporization may be first used to maintain, increase or decrease the amount of hydrogen necessary to inflate the balloonettes of a lighter than air airship.

In Fig. 1, therefore, pipe 33 is led to the suction side of a pump 52, the drive pulley 53 of which may be driven from the fly wheel 54 of engine 10 by a belt 55, or in any other suitable manner. A discharge pipe 56 leads from pump 52 to the interior of a balloonette 57, a plurality of which usually forms the gas holding compartments of a lighter than air airship.

Pipe 33 now leads from the interior of balloonette 57 to engine 10 as already described, and pipe 26 may now lead from the interior of balloonette 57, controlled by valve 27 to the interior of container 24, for the purpose of permitting a freer flow of liquid fuel from flask 40 and hastening the delivery of the same to header 16.

In this manner, the hydrogen gas performs a double function of maintaining the airship in the air and also of driving the engine which is supported by the airship, and in this way, large losses of hydrogen are eliminated when quick ascents or descents are to be made, because with lighter than air airships, reservoir 20 may be utilized to contain a large amount of water ballast which can be discharged suddenly when quick ascents are to be made. When quick descents are to be made, the volume of hydrogen in the balloonettes 57 can be reduced quickly because needle valve 31 may be closed and the supply of hydrogen for engine 10 taken solely from balloonettes 57 thereby reducing the lifting capacity of the airship very rapidly.

Liquid hydrogen is highly desirable as a fuel for air craft because one pound of hydrogen will contain approximately two to three times the effective number of B. t. u.'s as that contained in one pound of gasoline, or other usable hydro-carbons.

Inasmuch as the principal deterrent of long distance non-stop flights has been the weight of gasoline which has to be carried to accomplish the same, it will be apparent that if the same distance can be covered with half the weight of fuel, the pay load will be correspondingly increased, or the same load may be carried twice the distance. Other advantages are the elimination of incomplete combustion of the gasolines, the hydrogen being far superior due to its wide range of inflammability in oxygen mixtures, and the saving in wear and tear on mechanical parts of the engine due to carbon troubles and such like, this being particularly noticeable in engine valves.

Liquid hydrogen being much lighter than any known gasoline and due to its combustion effects is, therefore, highly desirable as a fuel and when properly insulated and kept free from contamination with air will last a sufficient period of time to complete a predetermined trip without undue loss or danger.

Liquid hydrogen is normally a permanent gas and is only liquefied by great cold under pressure, the hydrogen remaining liquid at atmospheric pressure when held in the proper insulated containers with slight but continued evaporation.

Inasmuch as the combustion products of hydrogen and oxygen from an internal combustion engine comprise solely water, or as it leaves the engine at high temperature, steam, it is obvious that the exhaust gases (steam) can be used for heating purposes and large amounts of condensed water are obtained.

The use of hydrogen gas offers a means of very easy starting in any kind of weather, and this is of great advantage in air craft, this being accomplished by drawing gaseous hydrogen direct from balloonette 57 through pipe 33 and also through pipe 26, heat exchanger 15 and pipe 33, it being understood that pipe 32 is of sufficient diameter to pass gaseous, as well as liquid, fuel from container 24.

I claim as my invention:

1. The method of supplying fuel to an internal combustion engine carried by a lighter than air airship which comprises drawing a liquid fuel into a heat exchanger, therein vaporizing the fuel by heated exhaust gases from the engine, forcing the vaporized gases into the airship to support the same in the air, and feeding vaporized fuel from the airship to the engine.

2. The method of supplying fuel to an internal combustion engine carried by a lighter than air airship which comprises drawing liquid hydrogen into a heat exchanger, therein vaporizing the hydrogen by exhaust steam from the engine, forcing the vaporized hydrogen into the airship to support the same in the air, and feeding gaseous hydrogen from the airship to the engine.

3. In combination, an air craft, an internal combustion engine carried by the air craft, a liquid fuel container, means for supplying fuel from the container to the air craft, and delivering the same thereto in gaseous form and means for supplying fuel from the air craft to the engine.

4. In combination, a lighter than air airship, an internal combustion engine carried by the airship, a liquid fuel container, means for supplying fuel from the container to the airship, means for supplying fuel from the airship to the engine; and means for gasifying said fuel by heat in its passage to said airship from said container.

5. The combination with a lighter than air airship of an internal combustion engine carried by the airship, a liquid fuel container, a pump connected to the fuel container for drawing fuel therefrom, a conduit connecting the pump and airship through which said pump delivers fuel into the airship in gaseous form, and means for supplying fuel from the airship to the engine.

6. The combination with a lighter than air airship of an internal combustion engine carried by the airship and having an exhaust pipe, a fuel container, a pump connected to the fuel container for drawing fuel therefrom, a vaporizer connected to the fuel container, pump and exhaust pipe, a conduit connecting the pump and airship for forcing fuel into the airship, and means for supplying fuel from the airship to the engine.

7. The combination with a lighter than air airship of an internal combustion engine carried by the airship and having an exhaust pipe, a liquid fuel container, a pump connected to the fuel container for drawing fuel therefrom, a vaporizer connected with the container, pump and exhaust pipe for vaporizing the liquid fuel therein, a conduit connecting the pump and airship for forcing vaporized fuel into the airship, and means for supplying vaporized fuel from the airship to the engine.

8. The combination with a lighter than air airship of an internal combustion engine carried by the airship and having an exhaust pipe, a heat insulated liquid fuel container, a pump connected to the fuel container for drawing fuel therefrom, a vaporizer connected to the pump and container and exhaust pipe, a conduit connecting the pump and airship for forcing vaporized fuel into the airship, and means for supplying vaporized fuel from the airship to the engine.

9. In an air craft, a propeller, an internal combustion engine for operating said propeller, a reservoir containing liquid hydrogen, means heated by steam generated in said engine for gasifying said liquid hydrogen in its passage from said reservoir to said engine, and means for mixing air with the hydrogen gas and introducing the same as an explosive mixture into said engine.

10. In an air craft, a propeller, an internal combustion engine for operating said propeller, a reservoir containing liquid hydrogen carried by said craft spaced from said engine, a passage for conducting hydrogen from said reservoir to said engine, means in said passage for gasifying said hydrogen, means in said passage posterior to said first named means for introducing a gas to form with said hydrogen an explosive mixture for said engine, and means for utilizing the products of combustion of said engine as ballast for said airship.

In testimony whereof I affix my signature.

CHARLES L. STOKES.